Oct. 20, 1942.                C. L. BRACKETT                 2,299,209
                              SELF-LOCKING NUT
                           Filed May 22, 1941            2 Sheets-Sheet 1

Inventor
CLARE L. BRACKETT

By  E. F. Salter
                Attorney

Oct. 20, 1942.   C. L. BRACKETT   2,299,209
SELF-LOCKING NUT
Filed May 22, 1941   2 Sheets-Sheet 2

Inventor
CLARE L. BRACKETT

By
Attorney

Patented Oct. 20, 1942

2,299,209

UNITED STATES PATENT OFFICE 2,299,209

SELF-LOCKING NUT

Clare L. Brackett, Detroit, Mich.

Application May 22, 1941, Serial No. 394,722

3 Claims. (Cl. 151—21)

This invention relates to the art of lock nuts; particularly to that class of such nuts in which the locking effect is procured through radial constriction of the nut threads on the mating threads of a member with which the nut is engaged.

An object of the invention is to provide a nut of unitary construction having means progressively operative from the base of the nut outward, as it is tightened in work engagement, to contract the nut bore and thus force the nut threads into firm locking engagement with the threads of its associated male threaded member.

Another object of the invention is to provide a nut of integral construction in which separate portions of the nut body are successively moved into thread locking engagement with an associated male member by compression of the work engaging face of the nut as it is forced against the work. Other objects will be apparent from the description.

Figure 1:
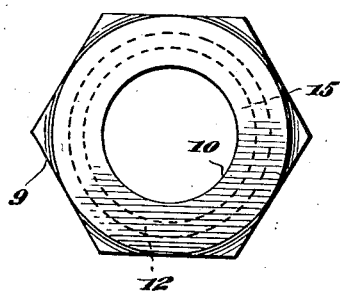
Figure 1 is a top plan view of a nut blank at an initial stage of formation.
Figure 4:
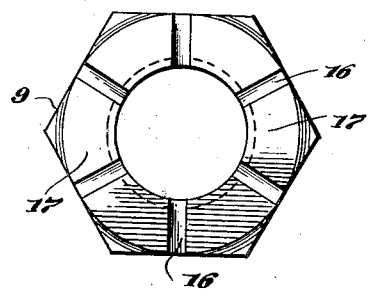
Figure 4 is a top plan view of the nut in completed form.

My improved nut is formed from a blank 9, here shown as hexagonal, with the usual axial bore 10. The work face 11 is provided with an integral cylindrical extension 12 which projects axially from the work face with its periphery being disposed appreciably radially inward of the nut periphery, and the extension is formed with a bore 13 diametrically enlarged relative to the bore 10 with which it communicates.

The extension bore 13 is continued axially inwardly to a depth line 14 which lies in a plane perpendicular to the nut axis and parallel to the work face 11; so that the plane of the depth line 14 is spaced axially and inwardly from the plane of the work face. Beyond the line 14 the extension bore is beveled, as at 15, into communication with the nut bore. The diameter of the bore 13 is such that the wall of the extension 12 is relatively thin.

Figure 2:
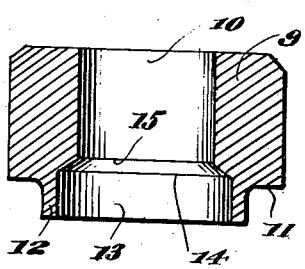
Figure 2 is a diametrical section therethrough.
Figure 5:
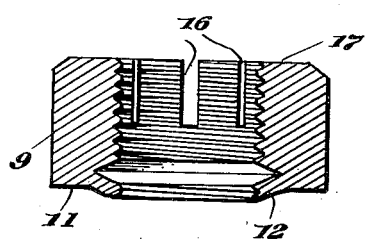
Figure 5 is a diametrical section therethrough.
Figure 6:
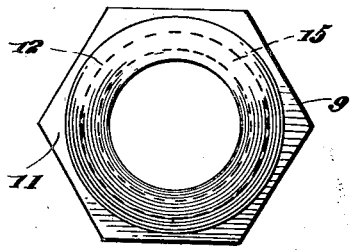
Figure 6 is a bottom plan view of the completed nut.
Figure 3:
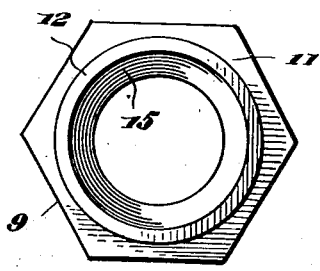
Figure 3 is a bottom plan view of the blank.

After the nut blank is formed as shown in Figures 1 to 3, the extension 12 is swaged inwardly as shown in Figure 5 to project from the work face at an incline relative to the axis of the nut and with its apex aperture in axial registry with the bore 10. The blank is then castellated by cutting radial slots 16 inwardly from the outer end face to substantially half the depth of the nut, forming the segments 17. The bore is then thread tapped, as is also the apex of the extension; and the nut is finished. It is an important feature of the invention that the thickness of the extension 12 is such that substantially only a single thread can be tapped therein.

Figure 7:
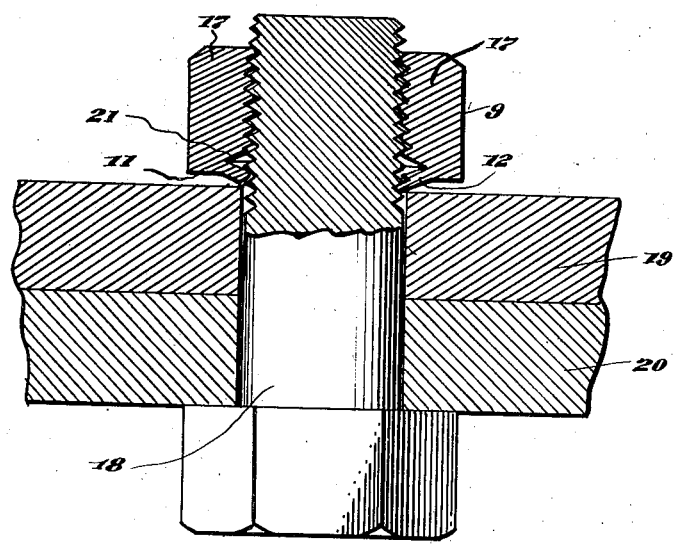
Figure 7 is an axial section illustrating the nut in finger tight work engagement.
Figure 8:
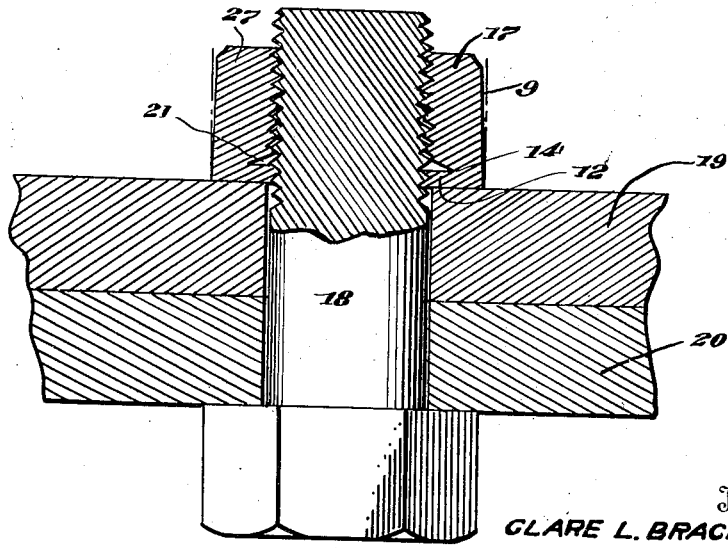
Figure 8 is a section similar to Figure 7 but illustrating the nut in wrench tight full work engagement.

Figures 7 and 8 illustrate a service application of the nut over the threaded stem 18 of a bolt for clamping together a pair of plates 19 and 20. The nut is finger tightened until the compressible extension 12 contacts the work 19, as shown in Figure 7. Tool force is then required to thread the nut fully home, and as the nut is rotated the thin-walled extension 12 is compressed radially and axially inward until its work contacting face flattens out in the plane of the nut work face 11, at which point, due to resultant radial constriction, the thread of the extension will have been forcibly and tightly jammed into locking engagement with the bolt threads with the work engaging faces 11 and 12 merging to give maximum work bearing engagement.

The provision of the bevel 15 creates an internal annular recess 21 within the nut body which has a radially and inwardly inclined wall that meets the inner face of the extension at an acute angle of which the apex lines in the plane of the depth line 14 and substantially midway between the nut bore and its peripheral face. The internal relief thus afforded permits a radial inward rocking of the segments 17 under the increased pressure applied over the peripheral zone of the nut work face between the apex of the recess 21 and the periphery of the nut when rotation of the nut is continued beyond the point at which the extension 12 has been flattened. Such continued rotation radially contracts the nut bore over its entire axial extent and forces the segments 17 inwardly from their initial position indicated by dotted line in Figure 8. This action follows immediately after full compression of the extension 12, and thus progressively increases the thread contact by closing in the segments 17 forcibly upon the bolt stem, thereby greatly increasing the grip of the nut threads on the threads of the bolt.

The slotted construction of the nut insures maximum thread load distribution, and the combined progressive locking action of the compressible extension and segments effects a tight grip of the nut upon the bolt that is highly resistant to vibration and to loosening even though bolt tension should be released.

The internal annular recess 21, instead of being formed by swaging in the extension 12, may be provided by turning in a cutting operation upon the blank. It is to be understood that the disclosed embodiment is susceptible of variation in detail within the limits imposed by the scope of the invention as claimed.

I claim:

1. A self-locking nut comprising an internally threaded body provided on its work face with an annular axial extension inclined inwardly to the nut axis, said extension being apertured and threaded in conformity with the body threads and being compressible by work engagement flatly into the base of the nut, said body having therein an internal annular recess inwardly of said compressible extension, and the body being further provided with a circumferential series of radial slots extending from the outer end face of the nut to substantially its middle to form locking segments.

2. A self-locking nut comprising a body having an axial threaded bore radially enlarged adjacent the base of the nut, a substantially frusto-conical integral extension projecting axially from the nut base around the bore, the apex of said extension being apertured and threaded in conformity with the bore, said extension being compressible by work contact into the enlarged area of the nut bore in jamming engagement with the threads of a male member when associated therewith to lie flush with the work face of the nut for increased work contact surface, said body being slotted from its outer end to substantially its mid-portion to provide a circumferential series of lock segments, and said bore enlargement relieving the material of the body adjacent to and behind the work face of the nut whereby the outer marginal zone of the work face provides a fulcrum on which said segments rock radially inward upon the application of work pressure beyond the point of full compression of said extension.

3. A self-locking nut comprising a body having a threaded axial bore terminating inwardly of and adjacent the nut base in a radially enlarged unthreaded recess, a thin annular extension projected axially beyond the base of the nut at an incline thereto and apertured in registry with the threaded bore, the peripheral face of the extension aperture having therein a thread in continuation of the bore threads, said extension merging with the base of the nut inwardly of the nut periphery to provide a flat marginal zone around the periphery of the nut work face and being compressible by work contact axially inward to lie flush with the work face, and the body being radially slotted from its outer end for substantially half the depth of the nut to provide segments radially movable in a converging direction upon the application of work pressure to said flat marginal zone of the work face.

CLARE L. BRACKETT.